US006977641B2

(12) United States Patent
Fan et al.

(10) Patent No.: US 6,977,641 B2

(45) Date of Patent: Dec. 20, 2005

(54) BACKLIGHT MODULE AND LIQUID CRYSTAL DISPLAY DEVICE

(75) Inventors: Kuo-Shu Fan, Tainan County (TW); Ta-Chin Huang, Tainan County (TW)

(73) Assignee: Chi Mei Optoelectronics Corp., Tainan (TW)

( * ) Notice: Subject to any disclaimer, the term of this patent is extended or adjusted under 35 U.S.C. 154(b) by 283 days.

(21) Appl. No.: 10/205,255

(22) Filed: Jul. 25, 2002

(65) Prior Publication Data

US 2003/0142059 A1 Jul. 31, 2003

(30) Foreign Application Priority Data

Jan. 29, 2002 (CN) ............................... 91101491 A

(51) Int. Cl.[7] ............................................... G09G 3/36

(52) U.S. Cl. ........................... 345/102; 345/87; 345/89

(58) Field of Search ............................ 345/102, 55, 87, 345/88, 659, 75.2, 89; 315/169.3, 169.4; 349/71; 313/495

(56) References Cited

U.S. PATENT DOCUMENTS 4,748,546 A 5/1988 Ukrainsky
4,945,350 A * 7/1990 Kawamura .................. 345/102
5,214,522 A 5/1993 Tagawa
5,808,597 A * 9/1998 Onitsuka et al. ............ 345/102
6,069,449 A * 5/2000 Murakami .................. 315/158
6,661,181 B2 * 12/2003 Shin ........................ 315/169.4
2002/0041268 A1 * 4/2002 Yajima et al. .............. 345/102
2002/0057238 A1 * 5/2002 Nitta et al. ................... 345/87
2003/0122771 A1 * 7/2003 Sumiyoshi et al. ......... 345/102
2003/0201969 A1 * 10/2003 Hiyama et al. ............. 345/102
2004/0051692 A1 * 3/2004 Hirakata et al. ............ 345/102
2004/0076396 A1 * 4/2004 Suga .......................... 385/146
2004/0114343 A1 * 6/2004 Ho ............................. 362/31
2004/0160546 A1 * 8/2004 Huang et al. ................. 349/58
2004/0208210 A1 * 10/2004 Inoguchi ...................... 372/36
2005/0111219 A1 * 5/2005 Mai ........................... 362/218
2005/0116913 A1 * 6/2005 Ha et al. ...................... 345/89
2005/0122739 A1 * 6/2005 Huang et al. ............... 362/608

FOREIGN PATENT DOCUMENTS

JP 7-270783 10/1995
JP 7-272507 10/1995
JP 2001-272659 10/2001

* cited by examiner

*Primary Examiner*—Vijay Shankar
*Assistant Examiner*—Prabodh Dharia
(74) *Attorney, Agent, or Firm*—Senniger Powers

(57) ABSTRACT

The present invention mainly relates to a backlight module for use in a liquid display device. The backlight module comprises a plurality of lamps located above a reflecting plate. Each lamp comprises two ends while each end comprises an electrode. Voltage required for the lamps is provided by at least one inverter board located at least one of two sides of the reflecting plate; wherein the electrodes electrically connect to the at least one inverter board directly. Sizes of the backlight can be reduced in the present invention. Furthermore, costs of material and manufacturing are also reduced.

8 Claims, 4 Drawing Sheets

BACKLIGHT MODULE AND LIQUID CRYSTAL DISPLAY DEVICE

BACKGROUND OF THE INVENTION

1. Field of the Invention

The present invention mainly relates to a backlight module used in a liquid crystal display device, more particularly, to the connections between lamps and an inverter boards in a backlight module.

2. Description of the Related Art

A typical liquid crystal display device mainly comprises a liquid crystal panel. Because the liquid crystal panel does not emit light itself, a backlight module is needed to provide the liquid crystal panel enough luminescence. In order to comply with consumers' requests, the backlight module is directed to reducing the weight and saving the cost.

Nowadays, there are many kinds of backlight module of liquid crystal display device used in this field; wherein a direct under type backlight module 1 is shown in FIG. 1 which comprises a plurality of U-shaped (or linear) lamps 11 disposed above a reflecting plate 13 to provide the liquid crystal panel light source. Each end of the lamp 11 is connected to a wire 113 through an electrode 111, and the wires 113 located at the two ends of one lamp 11 are co-connected to a connector 114. The connector 114 is further connected to an output 121 on an inverter board 12 which provides the lamp 11 voltage required for illuminating. Besides, a dielectric protecting tube 112 which isolates the high voltage electrode 111 and allows the wire 113 to extend to outside, is usually applied to the electrode 111 to protect it.

The disadvantage of the backlight module 1 is an over large size thereof. Because the inverter board 12 which lies in the backlight module 1, connected with the lamp 11 through the wire 113 and the connector 114, a space should be kept for receiving the inverter board 12, wire 113 and connector 114 in an inactive area besides an active area for showing data. Therefore, the size cannot be reduced. In addition, the electrode 111 of the lamp 11 should be connected to the wire 113 first, and then the wires 113 at the two ends of the lamp 11 are connected to the connector 114 of the inverter board 12. Short appears in connections of such complicated connecting easily and forms defects. Furthermore, costs of material and manufacturing are high as each lamp 11 is connected to the output 121 through the connecter 114.

Therefore, the present invention is directed to developing a novel and improved backlight module by reducing the size of a liquid crystal display device and saving its cost.

SUMMARY OF THE INVENTION

One objective of the present invention is to provide a backlight module for use in a liquid display device. The backlight module comprises a plurality of lamps located above a reflecting plate. Each lamp comprises two ends while each end comprises an electrode. Voltage required for the lamps is provided by at least one inverter board located at least one of two sides of the reflecting plate; wherein the electrodes electrically and physically connect to the at least one inverter board directly. Sizes of the backlight can be reduced in the present invention. Furthermore, costs of material and manufacturing are also reduced.

DETAILED DESCRIPTION OF THE INVENTION

The preferred embodiments in the invention are described below.

The First Embodiment

Figure 1:
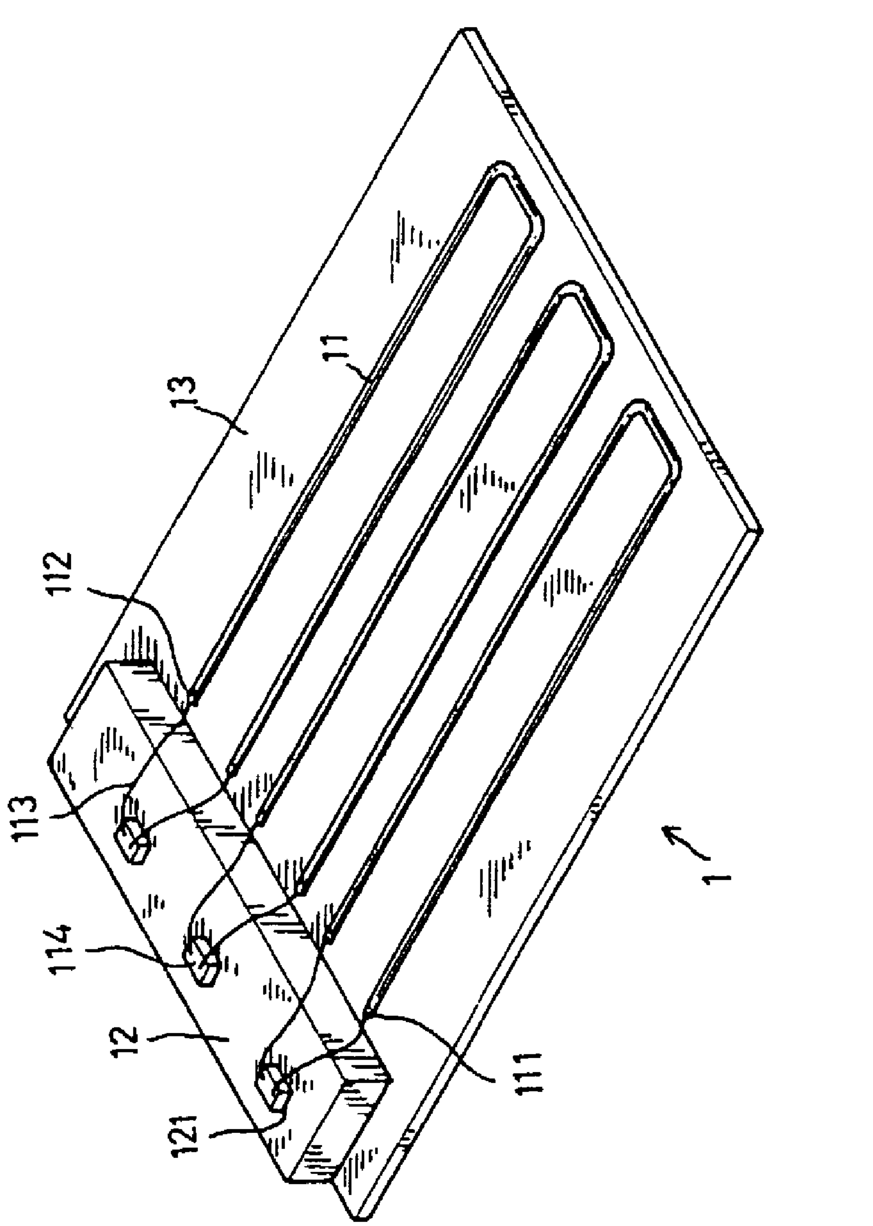
FIG. 1 illustrates parts of a conventional backlight module.
Figure 2:
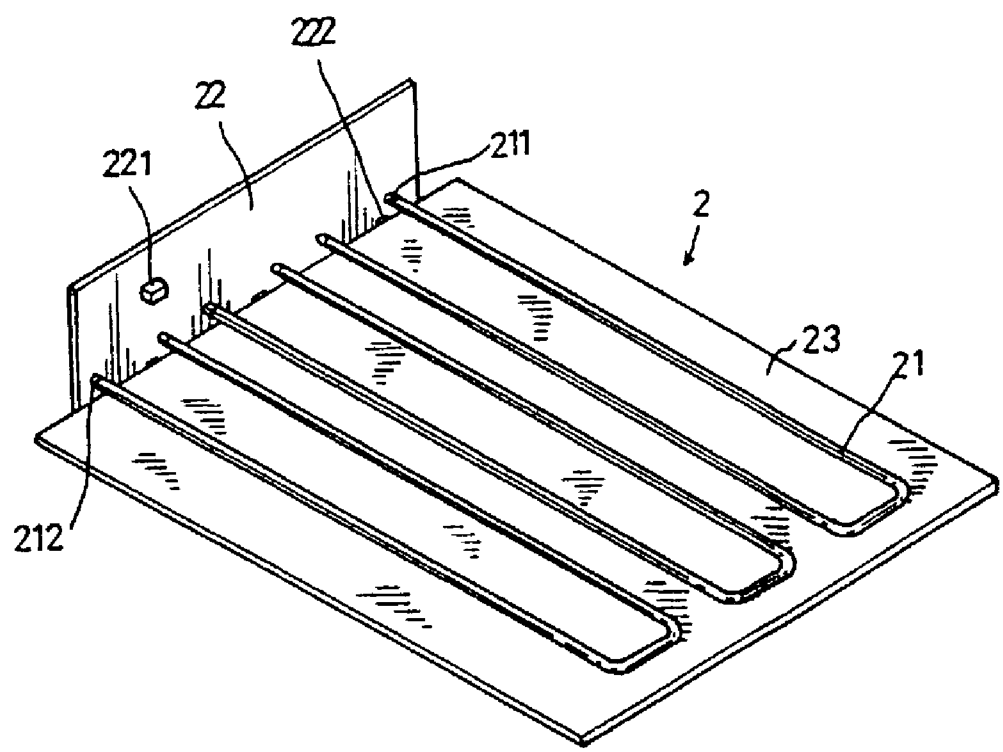
FIG. 2*a* illustrates parts of a backlight module according to the first embodiment of the invention.
FIG. 2*b* is a front view illustrating FIG. 2*a*.
Figure 2:
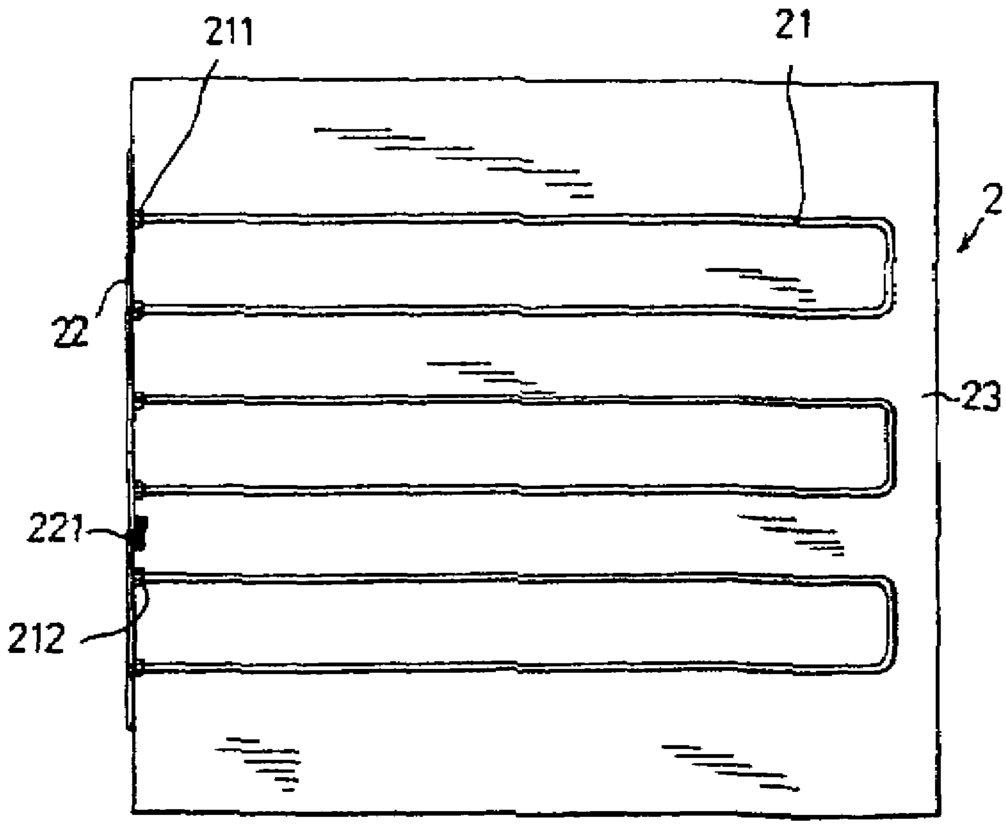

FIGS. 2*a* and 2*b* illustrate a backlight module 2 which comprises a plurality of U-shaped lamps 21 and light emitted therefrom is reflected by a reflecting plate 23 disposed under the lamps 21 to a liquid crystal panel. Each lamp 21 comprises two ends, each including an electrode 211 inputting power to the lamp 21, and the electrode 211 further electrically and physically connects to an inverter board 22 located at one side of the reflecting plate 23 to simultaneously provide voltage required for the lamps 21. The inverter board 22 can deliver voltage output by a single output 221 to the electrodes 211 separately through circuits on the inverter board 22. Besides, the inverter board 22 is disposed vertically to the reflecting plate 23 to connect the inverter board 22 directly. Preferably, the height of the inverter board 22 is less than the thickness of the backlight module 2. In the embodiment, the backlight module 2 further comprises a back cover (not shown), and the inverter board 22 further comprises a plurality of fixing elements 222 for fixing the inverter board 22 to the back cover. Besides, a protecting tube 212 for protecting and isolating the electrodes 211 can be applied to wrap the electrodes 211 as well; wherein the protecting tubes are made of dielectric material.

The inverter board 22 vertically to the reflecting plate 23 electrically and physically connects the electrodes 211 of the lamp 21 directly. All known methods can be utilized to attain such connections, for example, welding directly, connecting the electrodes 211 and the inverter board 22 through a wire and then cutting off excess wires. Since the wires are not necessary for connecting the inverter board, it is not necessary to provide every connector an output, either. Therefore, chances of short resulting from complicated connections in the prior art are quite slim, and steps of manufacturing are simplified, too. Besides, the present invention avoids having excess wires, connectors and outputs, and has the advantage of cost control. It is a great improvement in sizes of liquid crystal display device that a minimal space of disposing the vertical inverter board should be kept in an inactive area of the backlight module and the thickness thereof is not increased. Thus, the liquid crystal display device has an advantage of small volume.

The Second Embodiment

Figure 3:
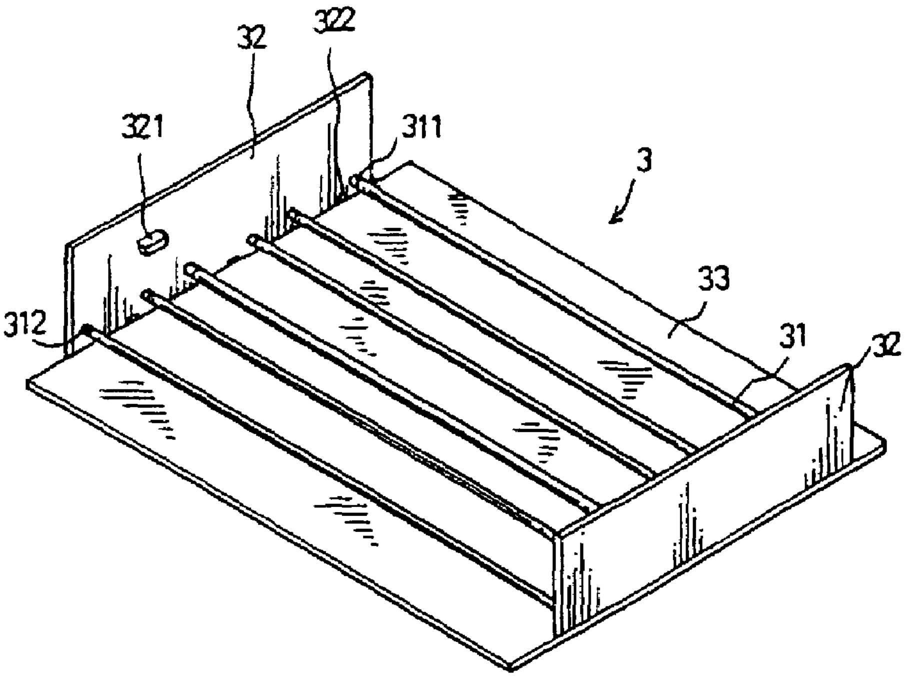
FIG. 3*a* illustrates parts of a backlight module according to the second embodiment of the invention.
FIG. 3*b* is a front view illustrating FIG. 3*a*.
Figure 3:
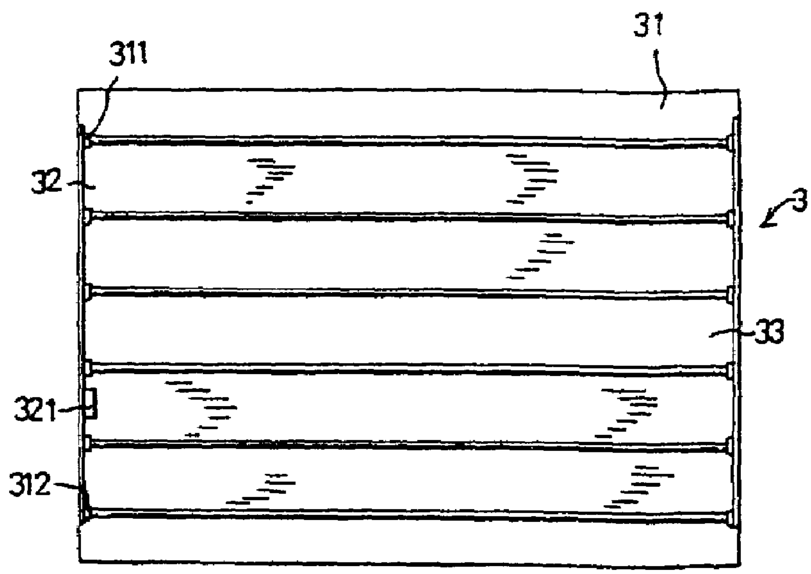

FIGS. 3*a* and 3*b* illustrate a backlight module 3 which is similar to the backlight module 2 in the first embodiment. The backlight module 3 comprises a plurality of linear lamps 31 above a reflecting plate 33, each lamp 31 comprising two ends, and each end electrically and physically connected to a first inverter board 32 through an electrode 311 and a second inverter board 34 located at opposite sides of the reflecting plate 33; wherein the inverter boards 32 and 34 stand vertically to the reflecting plate 33, directly connecting the electrodes 311 thereby. In the embodiment, the first inverter board 32 comprises a power-supplying end 321 enabling to provide the lamps 31 voltage and electrically connecting the second inverter board 34 through wires (not shown) to separately deliver voltage to every lamp.

The connections of the inverter board and the electrode, the designs of the circuit and power-supplying end can be made by those skilled in the art, based on their specific knowledge of electronics. Besides, other elements for additional effects, for example, fixing elements or protecting tubes, can be also added into the backlight module in the invention optionally.

The present invention is suitable for all kinds of direct under type backlight module, wherein numbers and shapes of the lamp and designs of circuit in the inverter board are not limited in the disclosures of the embodiments mentioned above. Backlight modules of liquid crystal display device having a plurality of lamps electrically connected to at least one inverter board directly to make a plurality of electrodes of the lamp disposed adjacently to the inverter board are in the scope of the invention.

As embodiments of the present invention have been illustrated and described, various modifications and improvements can be made by persons skilled in the art. The embodiments of the present invention are therefore described in an illustrative but not restrictive sense. It is intended that the present invention is not limited to the particular forms as illustrated, and that all the modifications not departing from the spirit and scope of the present invention are within the scope as defined in the appended claims.

What is claimed is:

1. A backlight module for use in a liquid crystal display device comprising:

a reflecting plate;

a plurality of lamps disposed above the reflecting plate, each of the lamps comprising two ends each including an electrode; and at least one inverter board located at least one of two sides of the reflecting plate to simultaneously provide voltage required for the lamps, wherein the electrodes electrically and physically connect the at least one inverter board directly, and the inverter board is disposed vertically to the reflecting plate.

2. A backlight module according to claim 1 which comprises an inverter board, wherein the lamps are U-shaped lamps which form the two electrodes to directly connect to the inverter board.

3. A backlight module according to claim 1 which comprises two inverter boards disposed at two opposite sides of the reflecting plate, respectively, wherein the lamps are linear lamps each of which forms the two electrodes to directly connect to the two inverter boards.

4. A backlight module according to claim 1 further comprising a plurality of protecting tubes to wrap the electrodes wherein the protecting tubes are made of dielectric material.

5. A backlight module according to claim 1, wherein the at least one inverter board comprises at least one power-supplying end disposed thereon.

6. A backlight module according to claim 1 further comprising a back cover, and the at least one inverter board further comprises a plurality of fixing elements to fix the at least one inverter board to the back cover.

7. A backlight module according to claim 1, wherein the electrodes are welded to the at least one inverter board directly.

8. A liquid crystal display device comprising a backlight module according to claim 1.

* * * * *